UNITED STATES PATENT OFFICE.

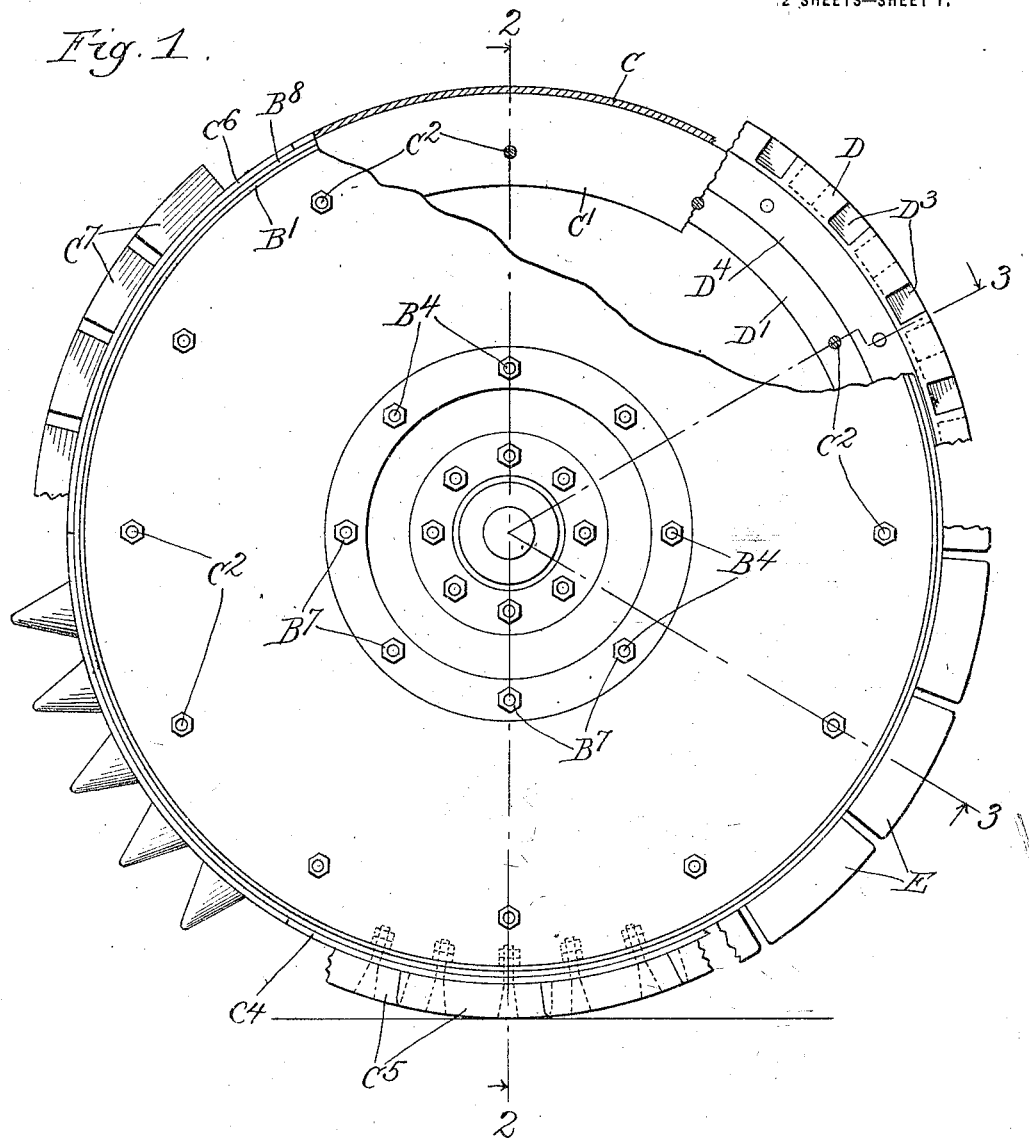

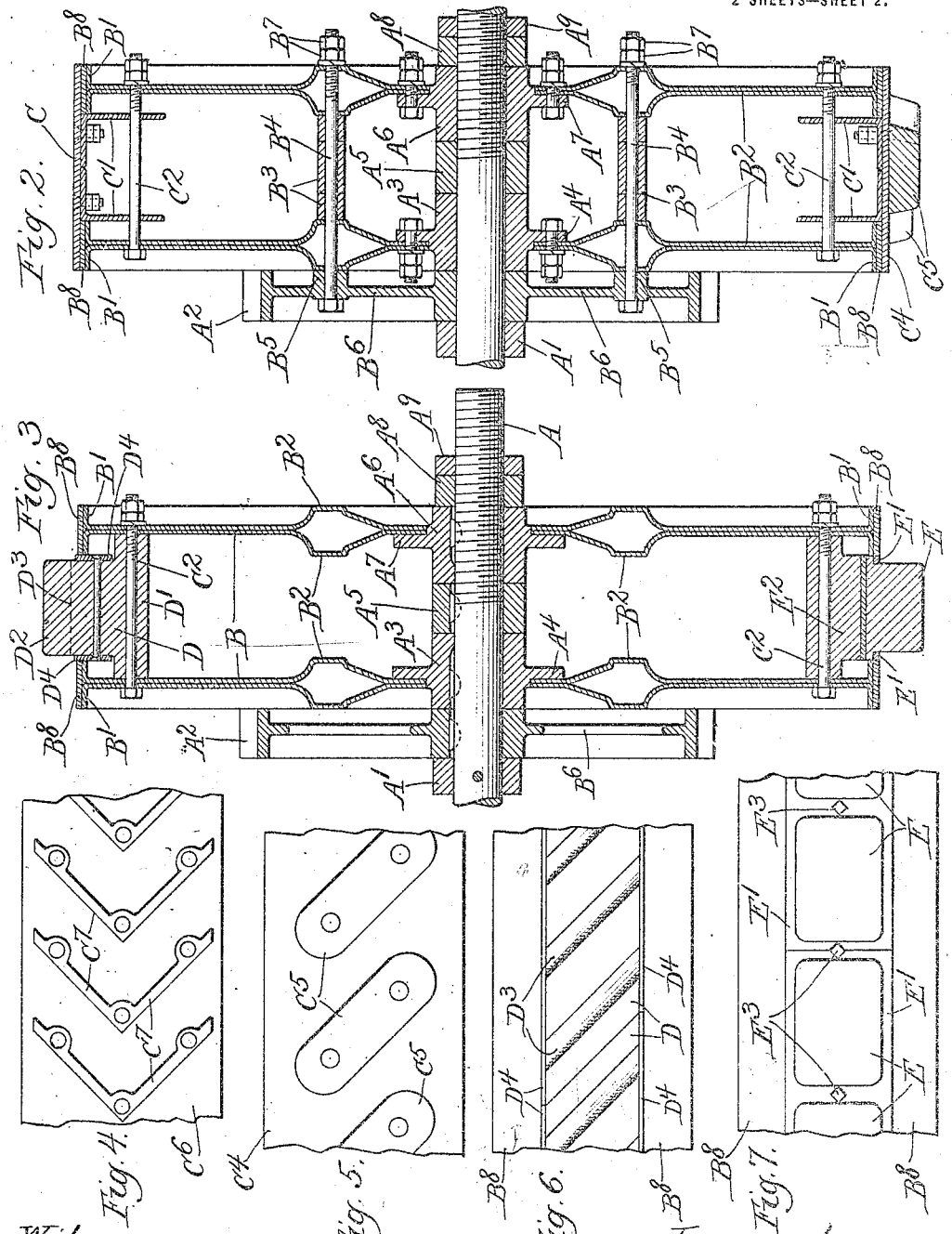

BRYON G. BAKER, OF LAPORTE, INDIANA, ASSIGNOR TO M. RUMELY COMPANY, OF LAPORTE, INDIANA, A CORPORATION OF INDIANA.

WHEEL.

1,151,988. Specification of Letters Patent. Patented Aug. 31, 1915.

Application filed July 28, 1913. Serial No. 781,498.

*To all whom it may concern:*

Be it known that I, BRYON G. BAKER, a citizen of the United States, residing at Laporte, in the county of Laporte and State of Indiana, have invented a certain new and useful Improvement in Wheels, of which the following is a specification.

Traction engines and tractors are equally well adapted to a number of different uses, such as, for instance, plowing, cultivating and the like in soft ground, road work, in the country and in the city. However, the wheels most suitable for these different uses vary particularly as regards their width, their shape or the condition of their tread surface, and it is accordingly exceedingly desirable to have wheels which may be varied or adjusted with a minimum of difficulty and loss of time to suit the different situations in which a particular tractor may from time to time be found.

With that end in view, I have provided a wheel made up of a pair of parallel disks removably attached to a hub. These wheels are preferably of steel stamping, strong and inexpensive and such as may be easily removed without any difficulty in the matter of assembling. I propose that each one of these stampings be provided with a relatively narrow rim. I might provide a perfectly flat or cylindrical rim having cleats or grouters of the usual type or else a type with a large number of different kinds of treads such as would be suitable for a large number of different conditions. These different treads might be made up of a number of different segments or singular annular rims, depending on the circumstances of manufacture and the size of the wheel. These would be placed in position by removing the outer disk, then clamping the new form of tread member between the outer and inner disks and bolting the parts together. Any unskilled laborer could perform this job with a minimum amount of difficulty, and thus a purchaser with this type of wheel would be equipped for any road conditions. The wheel, moreover, being made of rigid, fixed stampings, would be very light, strong and easily assembled.

My invention is illustrated diagrammatically in one form in the accompanying drawing, wherein—

Figure 1 is a side elevation of a wheel showing different forms of tread rims at different points; Fig. 2 is a section along line 2—2 of Fig. 1; Fig. 3 is a section along line 3—3 of Fig. 1; Fig. 4 is a plan view of a rim showing one form of the grouters attached thereto; Fig. 5 is a similar view showing a different form of grouters; Fig. 6 is a plan view showing wooden blocks; and Fig. 7 is a plan view showing rubber blocks.

Like parts are indicated by the same letter in all of the figures.

The shaft or axle $A$ which I have for the purpose of convenience shown as being rotatably mounted has fixed thereon a spacing sleeve or collar $A^1$. A bull pinion $A^2$ is mounted on the shaft $A$ having its hub in engagement with the collar $A^1$, being held against rotation therealong by any suitable means. A sleeve $A^3$ having a flange $A^4$ is also mounted on the shaft $A$, its end abutting against the opposed side of the hub of the bull pinion $A^2$. A spacing sleeve $A^5$ is slidably mounted on the shaft $A$ interposed between the sleeve $A^3$ and a similar sleeve $A^6$ which sleeve is provided with a flange $A^7$ similar to the flange $A^4$. A nut $A^8$ is screw-threaded on the shaft $A$ and adapted to hold the bull gear, the flanged sleeves and the spacing sleeve firmly against the collar $A^1$ and in fixed position with respect one to the other. It will be noted that the flanged sleeves similar to the bull gear are all held by suitable means against rotation about the shaft $A$. The lock nut $A^9$ is provided to hold the nut $A^8$ against rotation upon the shaft. As shown in Figs. 2 and 3 the shaft $A$ extends a considerable distance beyond the lock nut $A^9$ to provide for adjustment of the total length of the hub made up of the sleeves $A^3$, $A^5$ and $A^6$ although in actual practice this shaft will probably be cut off and a removable extension used.

Two-part annular wheel plates $B$ are bolted to the flanges $A^4$ and $A^7$. These wheel plates are made up of circular steel stampings or plates secured each to the other and arranged back to back and attached together in any suitable manner. These plates it will be noted have cylindrical reinforcing outer rims $B^1$ and annular reinforcing upset portions $B^2$. Spacing sleeves $B^3$ are interposed at suitable intervals between said upset portions $B^2$. Tie bolts $B^4$, passing through the sleeves $B^5$ on the arms B⁶ of the bull gear A², pass through the upset portions B² and the sleeves B³ and are held by the nuts B⁷ in fixed position, holding the bull gear, the spacing sleeves and the wheel plates in fixed and rigid position with respect each to the other.

B⁸ is a reinforcing ring surrounding and overlying the reinforcing flanges B¹ about the peripheries of the wheel plates, this ring being of such width that it overlies both the flanges or pair of stampings making up a single plate. It is attached to these flanges in any suitable manner not shown.

A cylindrical tread rim C is adapted to be arranged concentric with the wheel and overlies the reinforcing rims B⁸ and has rigidly attached thereto the reinforcing or supporting angles C¹ one side of which make a reinforcement for the back of the rim C, being parallel therewith, and the other side of which form a pair of supporting and guide webs parallel with the wheel plates. These webs are so disposed that as shown in Fig. 2 when the bolts C², passing through the wheel plates adjacent their peripheries and through these webs, are tightened up the wheel plates are drawn together so as to hold the tread rim C firmly in constricted position between the peripheries of the wheel plates, thus providing a smooth cylindrical wheel rim. As shown this rim C is made up of a plurality of separate segments which may be separately attached or removed from the main wheel frame. The relatively small size of these segments makes them comparatively light and easily manipulated. Thus the segments may be removed and others having different treads for different purposes may be substituted.

C⁴ is a cylindrical wheel rim identical with C in its construction and relation to the wheel except that it carries on its surface grouters C⁵ projecting above the surface and adapted to break up and grip the soil to give better traction than the smooth cylindrical surface of the rim C. This rim also is, as indicated, made up of sections whereby it may be easily removed.

C⁶ is a rim similar to C but provided with inclined grouters C⁷.

In Fig. 3 is shown a wooden tread rim made up of separated wooden segments D having an enlarged rim D¹ inside the wheel through which the bolt C² passes, having a narrow portion D² projecting outwardly beyond the periphery of the wheel and provided with inclined grooves D³ as indicated. Reinforcing or protecting plates D⁴ are rigidly attached to either side of the tread part D² where it passes between the rims B⁸.

In Fig. 7 and the lower side of Fig. 3 is shown a rubber tire made up of blocks or biscuits E held in position by the framework E¹ supported on the base E² which base is held between the wheel plates by the bolts C². The cap screws E³ hold the framework E¹ in position upon the base E².

I have shown the cylindrical bearing rim or tread made up of a plurality of sections. It will be quite obvious that it might be made only of one. It is quite obvious that these different forms of cleats or lugs might be removably attached to the rim and a separate rim carrying different types of grouters or treads will be used and put in position or removed according to the type of rim desired. The stiff cylindrical bearing rim, of course, carries all the wear and tear and the wheel plates and reinforcing parts are all protected and will need no renewal. When it is desired to insert a different kind of rim it is only necessary to unscrew the nuts on the outside bolts, take off the outside wheel plate, remove the unsatisfactory rim and replace it by another, replace the wheel plate and bolt the whole wheel together again. This is something which can be quickly and easily done by any one who knows how to handle a monkey wrench and the wheel is thus easily and quickly demountable. Any one having a tractor or motor vehicle adapted to be used for different kinds of service would have, of course, the different types of rims required either in one piece or in sections as the case may be and these different rims would be replaced from time to time as they become unsuitable by suitable types. The wheel is thus adjustable both as to its width of rim and as to the type of tread used. It is in effect an economical wheel and the rim may be demounted by releasing the nuts on the shaft and releasing the nuts on the holding bolts tying the wheel together, drawing off the nuts on the outside of the wheel rim and then removing the treads on the plates and replacing them by other tread segments. Of course, the rim might be continuous and might be removed as a whole. This would probably not be satisfactory, owing to its too great weight, and it is preferable, therefore, to make it segmental so as to be easily handled and manipulated, but this is not essential. It is only necessary that the rim segments which are removable or which are to be placed in position be provided with bolt holes in register with the bolt holes of the wheel plates so that the bolts may easily and conveniently pass through the bolt holes on the rim sections of the wheel plates. A great number of different types of treads might be used. I have illustrated a few, but it will be evident that my invention is not limited to any particular type of tread or any particular means for attaching any type of tread but must be understood broadly to cover any suitable tread adapted to be attached to any sort of heavy vehicle or tractor which is provided with a heavy, demountable, removable rim.

It will be evident that, while I have shown in my drawings an operative device, still many changes might be made in size, shape and arrangement of parts without departing materially from the spirit of my invention, and I wish, therefore, that my drawings be regarded as in a sense diagrammatic.

I claim:

1. A wheel for traction engines and the like comprising a flanged hub, wheel plates removably attached to the flanges thereon comprising a pair of integral, annular, concentric, sheet metal plates annularly grooved and peripherally flanged, a wheel rim removably mounted about the periphery of said plates, and means for holding said plates together adjacent their peripheries and at the annular grooves.

2. A wheel for traction engines and the like comprising an axle, a hub member slidable thereon and held against rotation thereabout, a spacing member on the axle and an outer hub member slidable on the axle and abutting said spacing member, means for holding the hub and spacing members together on the axle, wheel disks mounted one on each hub member and removably attached thereto, spacing members between the disks independent of the hub members and means for clamping the spacing members and the disk members together, a detachable rim mounted upon and supported upon the periphery of the wheel plates and means for holding the rim in position and the plates together.

In testimony whereof, I affix my signature in the presence of two witnesses this 17 day of July, 1913.

BRYON G. BAKER.

Witnesses:
   T. S. SEED,
   T. A. KIRSCH.